US009995646B2

(12) United States Patent
Kopp

(10) Patent No.: US 9,995,646 B2
(45) Date of Patent: Jun. 12, 2018

(54) MEASURING ARRANGEMENT WITH A MEASURING CELL FOR DETECTING A PROCESS PARAMETER AND A HOUSING SURROUNDING THE MEASURING CELL

(71) Applicant: VEGA GRIESHABER KG, WOLFACH, Wolfach (DE)

(72) Inventor: Thomas Kopp, Wolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days. days.

(21) Appl. No.: 15/040,496

(22) Filed: Feb. 10, 2016

(65) Prior Publication Data
US 2016/0258831 A1    Sep. 8, 2016

(30) Foreign Application Priority Data

Mar. 5, 2015  (EP) .................................... 15157902

(51) Int. Cl.
*G01L 19/14*  (2006.01)
*F16J 15/00*  (2006.01)
*F16J 15/06*  (2006.01)

(52) U.S. Cl.
CPC .......... *G01L 19/142* (2013.01); *F16J 15/002* (2013.01); *F16J 15/062* (2013.01)

(58) Field of Classification Search
CPC ......... G01L 19/142; G01L 7/00; G01L 19/14; G01L 19/0007; F16J 15/002; F16J 15/062
USPC ......................................................... 73/756
See application file for complete search history.

(56) References Cited

U.S. PATENT DOCUMENTS

| 5,665,920 | A | 9/1997 | Martin | |
|---|---|---|---|---|
| 5,869,766 | A | 2/1999 | Cucci et al. | |
| 7,448,274 | B2 * | 11/2008 | Drewes | G01L 19/003 73/700 |
| 7,607,353 | B2 * | 10/2009 | Kopp | G01L 19/0084 73/706 |
| 7,861,598 | B2 * | 1/2011 | Drewes | G01L 19/145 73/756 |

(Continued)

FOREIGN PATENT DOCUMENTS

EP    147134 A1    3/2004

OTHER PUBLICATIONS

European search report for related application 15157902.6-1557 dated Oct. 7, 2015.

*Primary Examiner* — Harshad R Patel
*Assistant Examiner* — Octavia Hollington
(74) *Attorney, Agent, or Firm* — William Gray Mitchell

(57) ABSTRACT

A measuring arrangement with a measuring cell for detecting a process parameter and a housing, surrounding the measuring cell at least radially, with the measuring cell being arranged in the axial direction at the front in the housing and a space between the measuring cell and the housing being sealed with a seal from the penetration of process medium, with the seal showing at least a first sealing element radially surrounding a measuring cell and a second sealing element radially surrounding the measuring cell, the second sealing element being distanced from the first sealing element in the axial direction and arranged in front thereof, and the housing showing at least one first section extending in the axial direction and at least one second section arranged thereat and extending in the radial direction between the sealing elements.

9 Claims, 3 Drawing Sheets

(56) References Cited

U.S. PATENT DOCUMENTS

2005/0000296 A1* 1/2005 Kopp .................. G01D 11/245
    73/756

* cited by examiner

MEASURING ARRANGEMENT WITH A MEASURING CELL FOR DETECTING A PROCESS PARAMETER AND A HOUSING SURROUNDING THE MEASURING CELL

CROSS REFERENCE TO RELATED APPLICATIONS

This patent application claims priority to European Patent Application 15 157 902.6-1557, filed on Mar. 5, 2015.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to a measuring arrangement.

Background of the Invention

Measuring arrangements are known in the prior art, as detailed in FIG. 5 of this application.

FIG. 5 shows a measuring arrangement 100 with a measuring cell 1 for detecting process parameters, for example, pressure, and a housing 5 at least radially surrounding the measuring cell 1. The measuring cell 1 is arranged in the axial direction A at the front in the housing 5, with a space 19 between the measuring cell 1 and the housing 5 being sealed with a seal 20 from the penetration of process medium from a process environment P. The seal 20 is arranged in the space 19 and rests at the rear, for example at a support area 17 of an electronic housing 4, which is also arranged in the housing 5. Additionally, the measuring cell 1 rests at the rear at the electronic housing 4 and/or the support area 17. A so-called housing adapter 12 is arranged at the rear at the housing 5, with a transition between the housing adapter 12 and the housing 5 being sealed via a circumferential seal 11. The housing 5 can be connected and fixed, for example via a pressure screw 9, which acts upon the housing 5, to a receptacle connection 8, for example a welding socket. The housing 5 is also sealed in reference to the receptacle connection 8 via a circumferential exterior seal 13, so that a media-tight arrangement of the measuring arrangement 100 is possible in a process environment P.

In this arrangement known from prior art the measuring cell 1, typically a pressure sensor with a seal 20 arranged radially in reference to the pressure sensor 1, is typically sealed by an O-ring. By the radial installation of the seal 20, the pressure sensor 1 can abut flush at the front with the housing 5, and this way it can be optimally arranged in the processing environment P.

In the arrangement known from prior art, it is considered disadvantageous that it frequently shows diffusion tightness, which is considered insufficient.

Here, the objective of the present invention is to further develop an arrangement known from prior art such that it shows increased diffusion tightness. Preferably, the arrangement should also allow an installation of the measuring cell flush with the front.

This objective is attained in an arrangement showing the features described herein.

BRIEF SUMMARY OF THE INVENTION

In a preferred embodiment, a measuring arrangement with a measuring cell for detecting a process parameter and a housing, at least radially surrounding the measuring cell, with the measuring cell being arranged in the axial direction at the front in the housing and a space between the measuring cell and the housing being sealed by a seal from the penetration of process medium, characterized in that the seal shows at least one first sealing element radially surrounding the measuring cell and a second sealing element radially surrounding the measuring cell, the second sealing element being arranged distanced from the first sealing element and in front of it in the axial direction, and the housing showing at least one first section extending in the axial direction and at least one second section arranged thereat and extending in the radial direction between the sealing elements.

In another preferred embodiment, the measuring arrangement as described herein, wherein the housing shows a third section extending in the axial direction, which projects beyond the second sealing element in the axial direction and with a fourth section being arranged thereat extending in the radial direction, which is positioned in front of the second sealing element in the axial direction.

In another preferred embodiment, the measuring arrangement as described herein, wherein the housing shows a fifth section extending in the axial direction, which projects beyond the measuring cell in the axial direction, at which a sixth section is arranged extending in the radial direction, and with a third sealing element being arranged between the sixth section and the measuring cell.

In another preferred embodiment, the measuring arrangement as described herein, wherein the housing is embodied at least in two parts, with a first part showing fastening organs for the indirect or direct fastening of the measuring arrangement to a receptacle as well as at least the first section and the second section, and the second part showing at least the third section and the fourth section and preferably the fifth section and the sixth section.

In another preferred embodiment, the measuring arrangement as described herein, wherein the first part and the second part are welded together.

In another preferred embodiment, the measuring arrangement as described herein, wherein the second part shows an external seal in addition.

In another preferred embodiment, the measuring arrangement as described herein, wherein the sealing elements are embodied as O-rings.

In another preferred embodiment, the measuring arrangement as described herein, wherein the fastening organs are embodied as a circumferential external brace and a pressure screw acting upon the external brace.

DETAILED DESCRIPTION OF THE INVENTION

Figure 1:
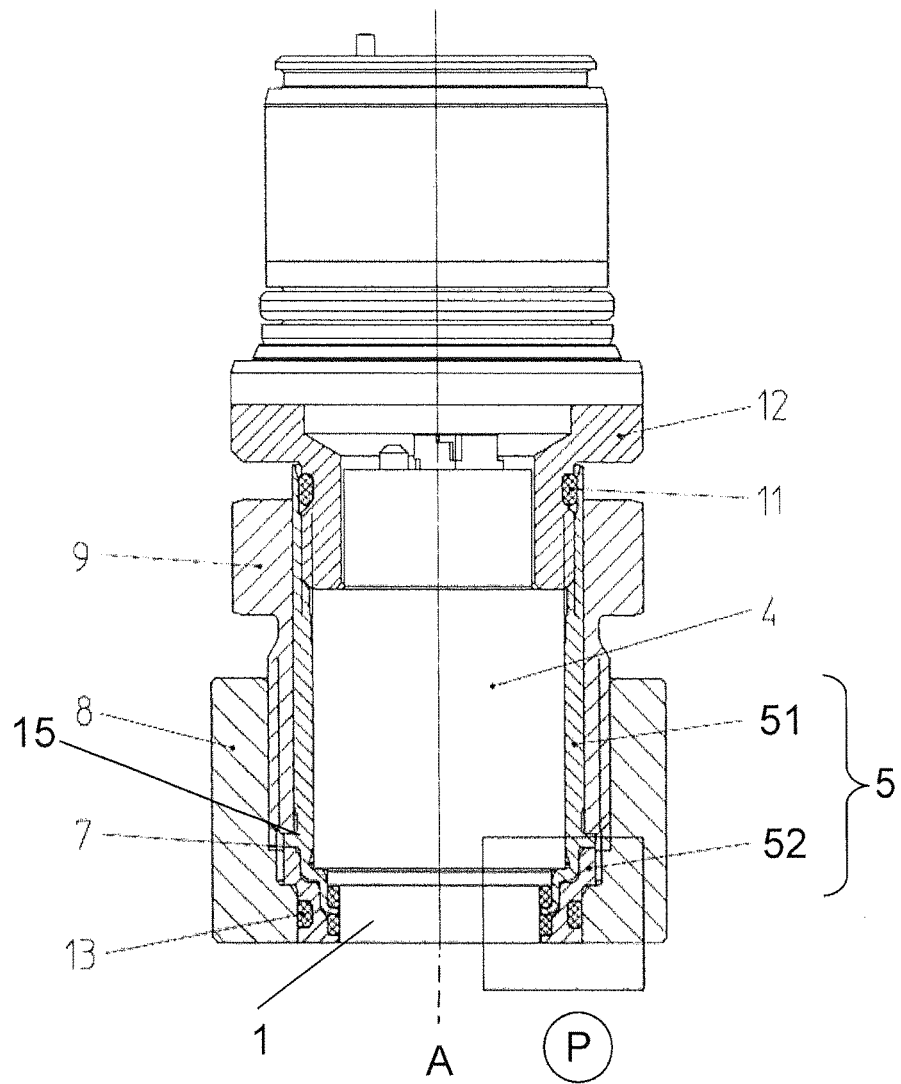
FIG. 1 is a line drawing evidencing a cross-sectional detail of an exemplary embodiment of a measuring arrangement with two radially arranged sealing elements.

The measuring arrangement according to the invention is a measuring cell for detecting a processing parameter and a housing at least radially surrounding the measuring cell, with the measuring cell being arranged in the axial direction at the front at the housing and a space between the measuring cell and the housing being sealed from the penetration of process medium with a seal and is characterized in that the seal shows at least one first sealing element radially surrounding the measuring cell, and a second sealing element radially surrounding the measuring cell, the second sealing element being distanced from the first sealing element in the axial direction and arranged in front thereof, and the housing showing at least one first section extending in the axial direction and at least one abutting second section, extending in the radial direction between the sealing elements.

By the arrangement of two sealing elements, located behind each other in the axial direction, which are separated from each other by the second housing section extending in the radial direction, the diffusion tightness of the seal provided is considerably increased, with the housing section arranged between the sealing elements providing a mechanical stop for the sealing elements, which prevents interactions between the sealing elements, for example any flowing of a thermoplastic elastomer of the sealing elements used.

In a further development of the measuring arrangement, the housing shows a third section, extending in the axial direction, which projects beyond the second sealing element in the axial direction and with a fourth section being arranged thereat, extending in the radial direction, which is located in front of the second sealing element.

By such an embodiment of the housing, which ensures that a radially extending housing section is positioned in front of the second sealing element and covers it from direct influences from the process environment, a considerably increased mechanical resilience of the arrangement is yielded and simultaneously a mechanical stop is provided for the second sealing element in the frontal direction.

Further, the housing may show a fifth section extending in the axial direction, which projects beyond the measuring cell in the axial direction, at which a sixth section is arranged, extending in the radial direction, and with a third sealing element being arranged between the sixth section and the measuring cell.

By such an embodiment of the housing, a third sealing element can be used, arranged at the facial side, which then rests between the measuring cell and the housing, on the one hand, further increasing the diffusion tightness of the described arrangement and on the other hand, providing a mechanical stop for the measuring cell. This way, it can be prevented that the measuring cell is pulled out of the housing, for example by a vacuum.

In order to allow both a design of the housing with two as well as three sealing elements, it is beneficial for the housing to be embodied at least in two parts, with a first part comprising fastening organs for the indirect or direct fastening of the measuring arrangement to a receptacle as well as at least the first section and the second section, and the second section comprising at least the third section and the fourth section and preferably the fifth and the sixth section.

By a two-part embodiment of the housing, particularly an embodiment in which the second part of the housing is designed annularly and connected at the front with the first part of the housing, it is advantageous that the first part of the housing, both for an embodiment with two sealing elements as well as an embodiment with three sealing elements between the measuring cell and the housing, can be designed identically. Variations in the housing design for the second sealing element or the second sealing element and the third sealing element are realized by the second part of the housing, which is preferably welded to the first part of the housing.

In the second part of the housing, an external seal may be arranged in addition, which seals the housing from a receptacle connection, for example a flange welded thereto.

Preferably the fastening organs are embodied as circumferential exterior braces as well as a pressure screw acting upon the exterior brace such that the housing can be stressed by the pressure screw in a receptacle connection, for example a welded flange or an appropriately embodied socket of a receptacle.

DETAILED DESCRIPTION OF THE FIGURES

Figure 2:
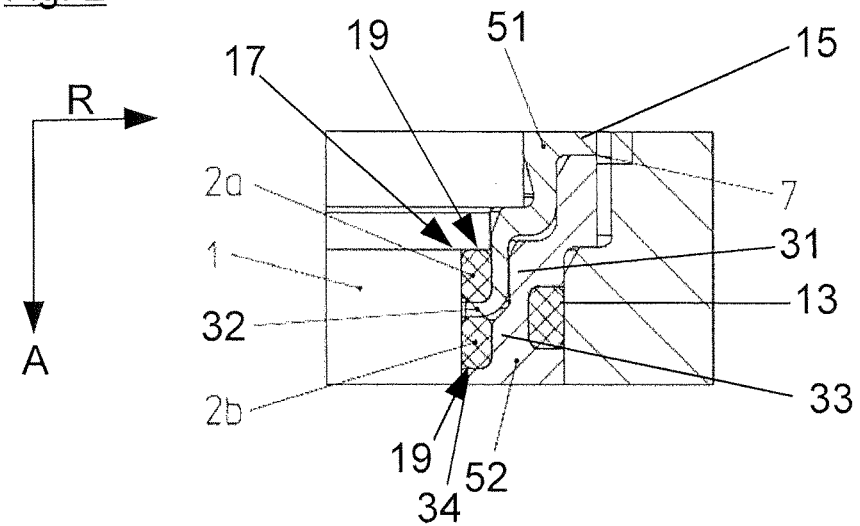
FIG. 2 is a line drawing evidencing enlarged detail of FIG. 1.

FIG. 1 shows a cross-sectional detail through a first exemplary embodiment of a measuring arrangement 100. FIG. 2 shows an enlarged detail of FIG. 1.

In the measuring arrangement 100 shown in FIGS. 1 and 2, a measuring cell 1 is arranged, in the present case a pressure-measuring cell, at the front side in a housing 5, which radially surrounds the measuring cell 1. The measuring cell 1 rests in a housing 5 in the axial direction A at the front side, i.e. facing a process environment P, and is arranged such that a process parameter of the process environment P can be detected by the measuring cell 1, for example pressure. The housing 5 of the measuring arrangement 100 is embodied in the present exemplary embodiment in two parts, with a first part 51 of the housing 5 accepting an electronic housing 4, with the measuring cell 1, arranged at the front side of the electronic housing 4, resting at the rear on a support area 17. Furthermore, the first part 51 of the housing 5 shows a circumferential external brace 15, with a pressure screw 9 encompassing the housing 5 acting upon it, by which the housing 5 can be clamped in a receptacle connection 8, for example a welding socket.

At the back of the electronic housing 4, a housing adapter 12 is screwed into the housing 5, with the electronic housing 4 resting on it. A transition between the housing adapter 12 and the housing 5 is sealed by a circumferential seal 11. The housing adapter 12 carries at the rear respective connection options for measuring electronic or suitable connectors, for example a bus connection.

At the front, the first part 51 of the essentially hollow-cylindrically embodied housing 5 shows a first section 31, which extends in the axial direction A and with a second section 32 being arranged thereat, extending in the radial direction R. The second section 32 is embodied such that it mechanically separates a first seal 2a and a second seal 2b, arranged between the measuring cell 1 and the housing 5 and/or the measuring cell 1 and the housing parts 51, 52, and prevents interactions between the sealing elements 2a, 2b. In particular, the second section 32 serves as a frontal stop for the first sealing element 2a as well as a rear stop for the second sealing element 2b.

As already mentioned, the housing 5 is embodied in two parts in the present exemplary embodiment, with the second part 52 of the housing 5 essentially being shaped annularly and showing at least one third section 33, which extends in the axial direction A and a fourth section 34 is arranged at the front side thereof, extending in the radial direction. The third section 33 is sized such that it projects beyond the second sealing element 2b in the axial direction, so that the fourth section 34 is arranged at the front side towards the second sealing element 2b. This way, the fourth section 34 forms a mechanical protection for the second sealing element 2b from any abrasive process environment P and acts as a mechanical stop in the frontal direction such that the second sealing element 2b cannot be pulled out of the housing 5, for example by a vacuum.

The first part 51 and the second part 52 of the housing 5 are connected to each other via a circumferential seam 7, for example a welding seam, so that a uniform housing 5 is formed.

In the second part 52 of the housing 5, in a circumferential groove, additionally the circumferential external seal 13 is arranged, which seals the housing 5 from the receptacle connection 8. In the present exemplary embodiment all sealing elements 2a, 2b, 11, 13 are embodied as O-rings, and thus they can be realized advantageously with high quality.

Figure 3:
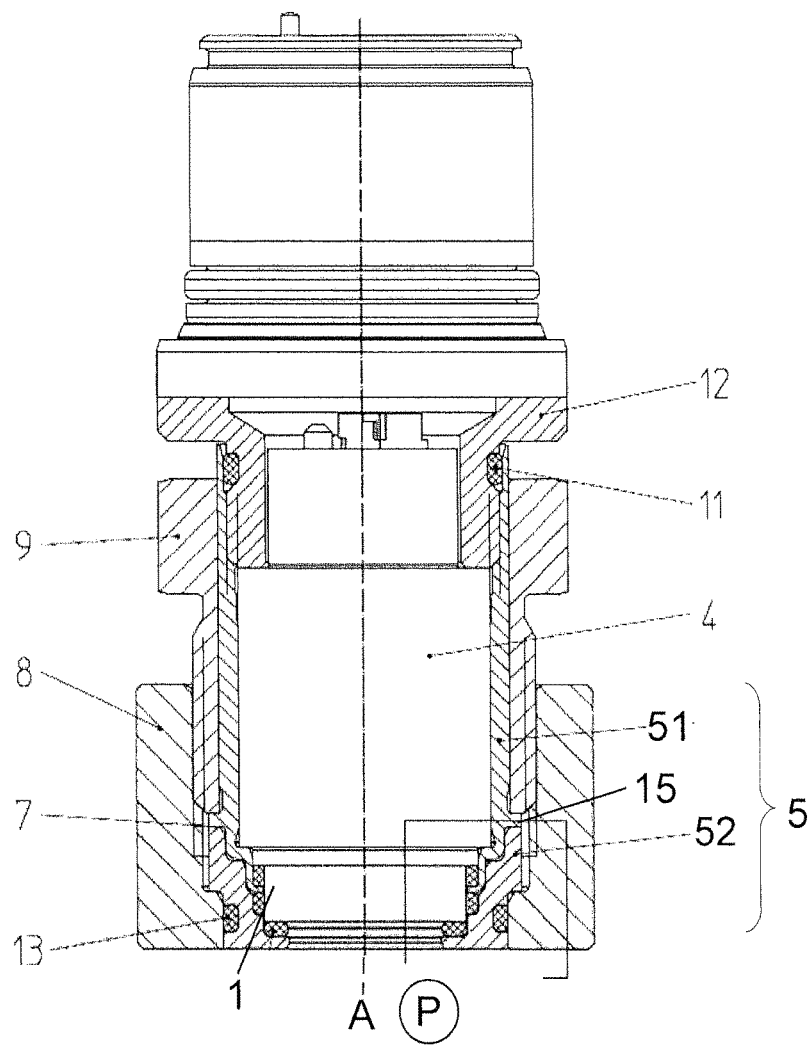
FIG. 3 is a line drawing evidencing a cross-sectional detail of an exemplary embodiment of a measuring arrangement with two radially arranged sealing elements as well as a facially arranged sealing element.
Figure 4:
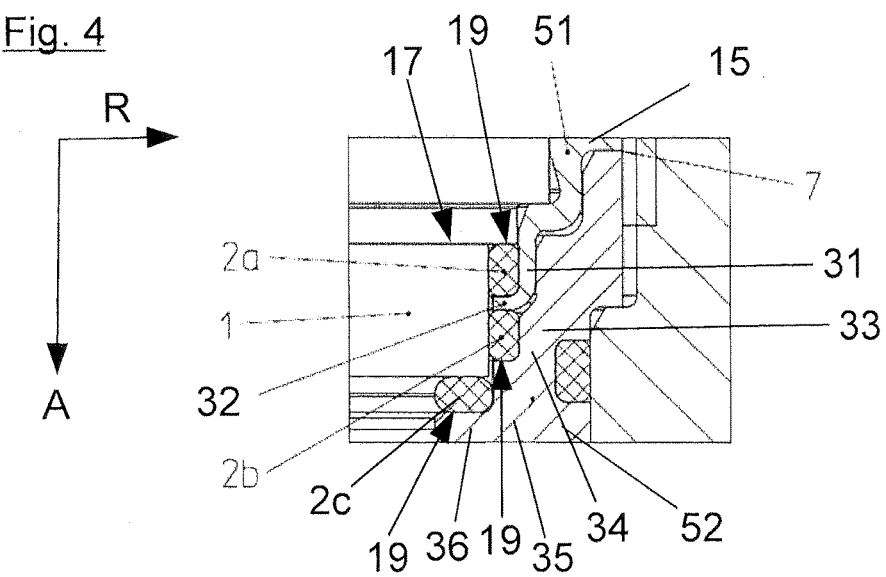
FIG. 4 is a line drawing evidencing an enlarged detail of FIG. 3.
Figure 5:
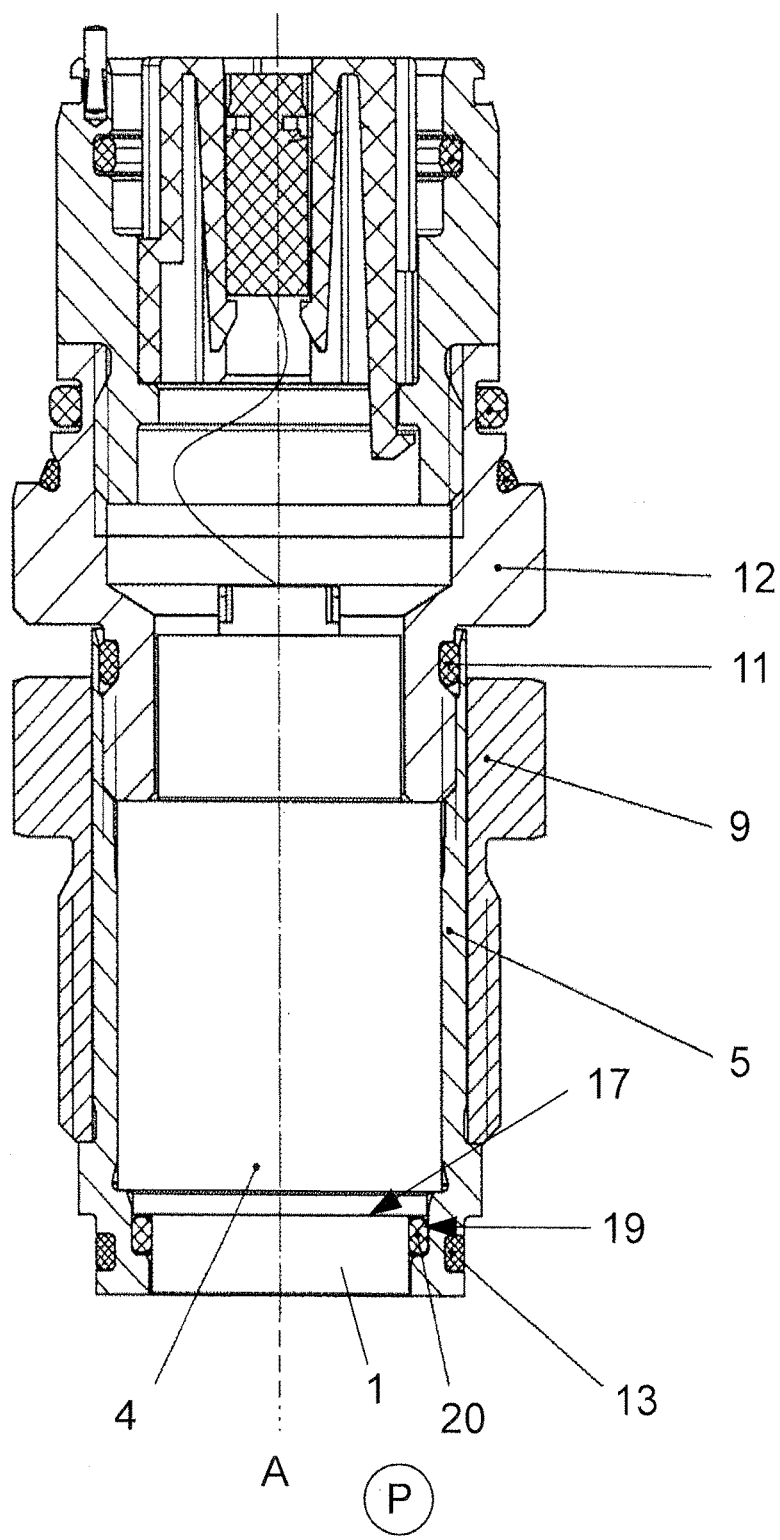
FIG. 5 is a line drawing evidencing a measuring arrangement according to prior art (as previously discussed).

FIGS. 3 and 4 show a cross-sectional detail as well as an enlarged detail of another exemplary embodiment of a measuring arrangement 100 with radially arranged sealing elements 2a, 2b as well as a facially arranged third sealing element 2c. The design of the measuring arrangement according to FIGS. 3 and 4 differs from the design of the measuring arrangement 100 of FIGS. 1 and 2 essentially in the embodiment of the second part 52 of the housing 5 such that here, to avoid repetitions with regards to the identical features, reference is made to the previous description.

The second part 52 of the housing 5 shows in the present exemplary embodiment a fifth section 35, which extends in the axial direction, starting from the fourth section 34, and projects at the front beyond the measuring cell 1 in the axial direction A. At the fifth section 35, a sixth section 36 is arranged, extending in the radial direction R, with a third sealing element 2c being positioned in a space 19 between the sixth section 36 and the measuring cell 1, arranged facing the measuring cell 1. Both the measuring cell 1 as well as the third sealing element 2c may rest at the sixth section 36, at the front in the axial direction A, so that the measuring cell 1 in this exemplary embodiment is mechanically supported at both the front as well as the back. The first part 51 of the housing 5 and the second part 52 of the housing 5 are also connected to each other via a circumferential welding seam 7 in the present exemplary embodiment, so that a uniform housing 5 is formed. Any impact of the process medium from the process environment P upon the sealing elements 2a, 2b, 2c is effectively reduced by the embodiment of the second part 52 of the housing 5 so that particularly abrasive media can only have a reduced influence upon the sealing elements.

LIST OF REFERENCE NUMBERS 1 pressure sensor/measuring cell
3 brace
4 electronic housing
5 housing
7 seam/welding seam
8 receptacle connection/welding socket
9 pressure screw
11 seal
12 housing adapter
13 external sealing
15 external brace
17 support area
19 space
20 seal
31 first section
32 second section
33 third section
34 fourth section
35 fifth section
36 sixth section
51 first part
52 second part
100 measuring arrangement
2a first sealing element
2b second sealing element
2c third sealing element
A axial direction
R radial direction
P process environment The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A measuring arrangement with a measuring cell for detecting a process parameter and a housing, at least radially surrounding the measuring cell, with the measuring cell being arranged in an axial direction at the front in the housing and a space between the measuring cell and the housing being sealed by a seal from a penetration of process medium, wherein the seal comprises at least one first sealing element radially surrounding the measuring cell and a second sealing element radially surrounding the measuring cell, the second sealing element being arranged distanced from the first sealing element and in front of the first sealing element in the axial direction, and the housing comprising at least one first section extending in the axial direction and at least one second section arranged thereat and extending in a radial direction between the sealing elements.

2. The measuring arrangement of claim 1, wherein the housing comprises a third section extending in the axial direction, which projects beyond the second sealing element in the axial direction and with a fourth section being arranged thereat extending in the radial direction, which is positioned in front of the second sealing element in the axial direction.

3. The measuring arrangement of claim 1, wherein the housing comprises a fifth section extending in the axial direction, which projects beyond the measuring cell in the axial direction, at which a sixth section is arranged extending in the radial direction, and with a third sealing element being arranged between the sixth section and the measuring cell.

4. The measuring arrangement of claim 1, wherein the housing is embodied at least in two parts, with a first part comprising fastening organs for indirect or direct fastening of the measuring arrangement to a receptacle as well as at least the first section and the second section, and a second part comprising at least the third section and the fourth section.

5. The measuring arrangement of claim 4, wherein the first part and the second part are welded together.

6. The measuring arrangement of claim 4, wherein the second part further comprises a fifth section and a sixth section.

7. The measuring arrangement of claim 1, wherein a second part comprises an external seal in addition.

8. The measuring arrangement of claim 1, wherein the sealing elements are embodied as O-rings.

9. The measuring arrangement of claim 1, wherein fastening organs are embodied as a circumferential external brace and a pressure screw acting upon the external brace.

* * * * *